Jan. 24, 1928.
L. JOHNSON
1,657,309
UNCOILER AND METHOD OF OPERATING THE SAME
Filed April 27. 1927
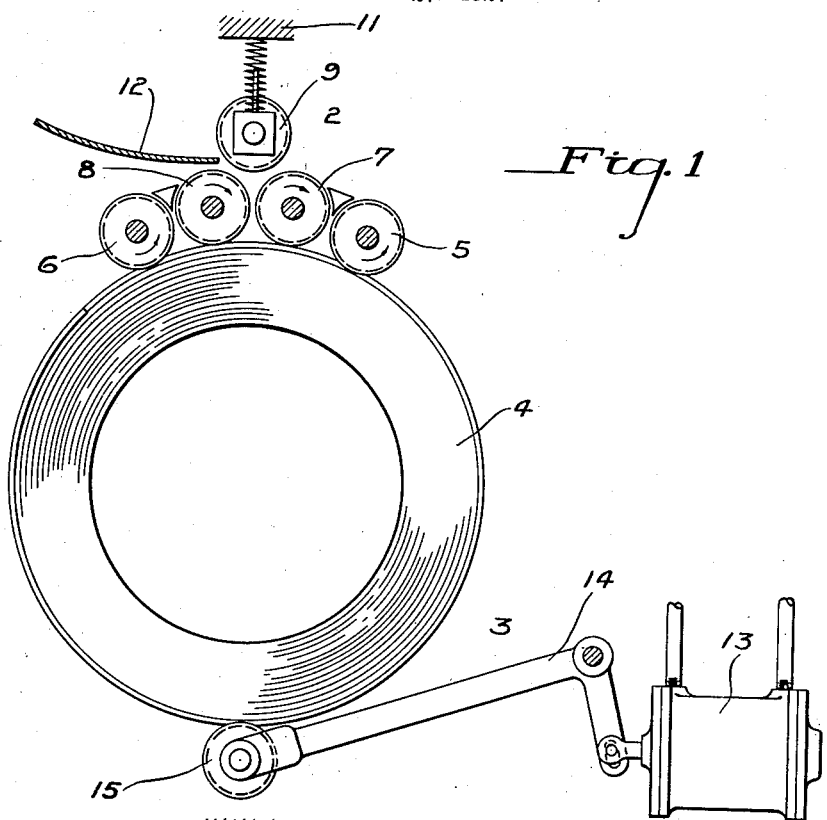
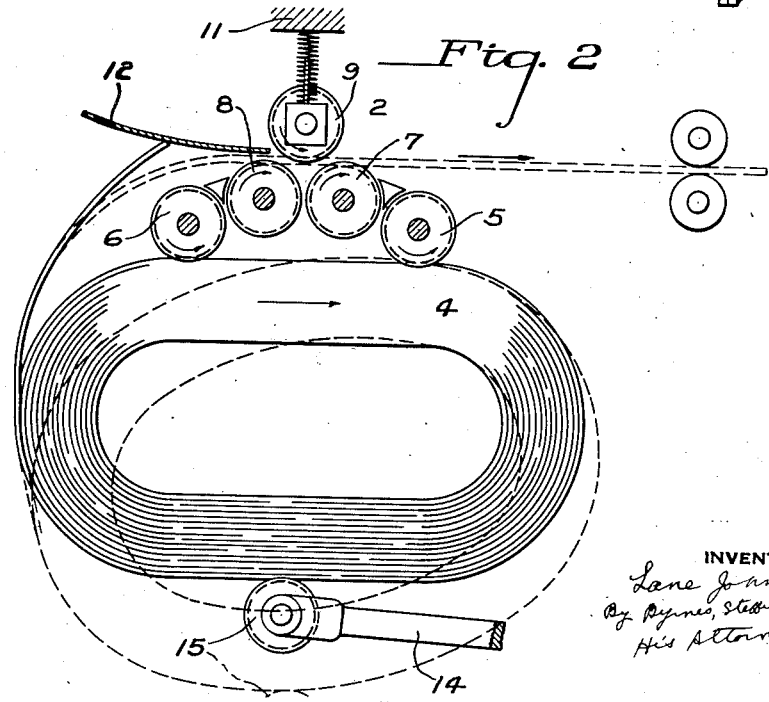
INVENTOR
Lane Johnson,
By Byrnes, Stebbins & Parmelee,
His Attorneys.

Patented Jan. 24, 1928.

1,657,309

UNITED STATES PATENT OFFICE.

LANE JOHNSON, OF PITTSBURGH, PENNSYLVANIA, ASSIGNOR TO UNITED ENGINEERING & FOUNDRY COMPANY, OF PITTSBURGH, PENNSYLVANIA, A CORPORATION OF PENNSYLVANIA.

UNCOILER AND METHOD OF OPERATING THE SAME.

Application filed April 27, 1927. Serial No. 187,020.

My invention relates to a method and apparatus for unrolling or uncoiling coiled bodies of material. One object of my invention is to provide a method for unrolling a body of coiled material which consists in first distorting the body of material to free one end thereof, and then moving the body of material to guide the free end into a feeder mechanism.

Another object of my invention is to provide a method for unrolling bodies of coiled material which consists in pressing the body of material against a roller mechanism in order to free one end thereof, and then to turn the body of material by the rollers in order to guide the free end into a suitable feeder mechanism.

In unrolling coiled material, such as metal bands, difficulty and delay have heretofore been encountered in introducing successive coils of material into feeder mechanisms associated with various types of finishing and punching machinery.

According to my invention, a roll of coiled material is placed between rollers constituting a portion of a feeder mechanism and a pressure roller, after which the pressure roller is actuated to distort the shape of the coiled body and thereby free one of its ends, and then the rollers are actuated to drive the free end of the coil into the feeder mechanism.

In the accompanying drawings—

Figure 1 is a diagrammatic view of apparatus embodying my invention in the first stage of operation; and Figure 2 is a similar view showing in solid lines the second step in the operation and in dotted lines the third step in the operation of the device.

My invention comprises, in general, a feeder mechanism 2 and a pressure mechanism 3, between which a body of coiled material 4 is confined in the manner hereinafter described.

The feeder mechanism 2 comprises a pair of rollers 5 and 6 that are connected to a common motor driving mechanism (not shown) and are caused to turn in a counter-clockwise direction. A second pair of rollers 7 and 8 are connected to another motor driving mechanism (not shown) and are caused to turn in a clockwise direction. The rollers 7 and 8 cooperate with a roller 9 that is adjustably supported from a suitable frame 11. The material is fed between the roller 9 and the rollers 7 and 8. A guiding device 12 is disposed to the left of the roller 9, as viewed in the accompanying drawings, for the purpose of guiding the free end of the coil between the rollers 8 and 9. In the event that the direction of rotation of the several rollers be reversed, the position of the guiding device 12 may be suitably varied.

The pressure mechanism 3 comprises a suitable cylinder 13 that is connected to a bell crank 14, one arm of which terminates in a roller 15. The roller 15 is adapted to engage the body of coiled material 4 and to force it into engagement with the rollers 5 and 6 upon the energization of the cylinder 13. The cylinder 13 may be controlled by any suitable valve mechanism (not shown).

In the operation of my unrolling mechanism, the body of coiled material 4 is placed between the rollers 15 and 5 and 6, with the free end to the side of the feeder mechanism 2 at which the guiding device 12 is disposed. The cylinder 13 is then actuated to apply pressure through the roller 15 to the coiled body 4 to cause it to assume the position shown in full lines in Figure 2. During this operation, the distortion of the body 4 causes the free end of the coil to spring outwardly and into engagement with the guiding device 12.

The rollers 5 and 6 are then actuated to turn the body 4 in a clockwise direction, thereby causing its free end to move along the under surface of the guiding device 12 and into engagement with the rollers 8 and 9. After the strip is engaged by the rollers 8 and 9, it is drawn into the feeding mechanism 2 and into engagement with the roller 7.

As soon as the metallic strip is passing through the feeding mechanism 2, the cylinder 13 may be de-energized to permit the roller 15 to move away from the body 4, after which the latter continues to turn, driven, in part, by its engagement with the rollers 5 and 6, and primarily by the action of the rollers 7, 8 and 9.

Accordingly, I have provided a method and apparatus for unrolling coiled bodies of material, such as sheet metal strips, that is characterized by distorting the body of the coiled material to free one of its ends and thereafter turning the distorted body of material sufficiently to guide the free end into engagement with a suitable feeder mechanism, thereby eliminating the necessity for manually feeding the end of the coil into the mechanism.

It will be understood that the feeding mechanism for engaging the end of the material and continuing the unwinding movement may be of any desired construction. It is herein illustrated, however, as embodying a plurality of rolls so located as to constitute, in effect, a roll straightening mechanism, the upper roll 9 being located intermediate the two lower rolls. Such an arrangement has been found to be decidedly advantageous in an uncoiling apparatus operating in accordance with the present invention since it functions automatically during the uncoiling operation to remove any kinks or bends which may have been formed in the material due to the distorting operation. It further serves to remove any bends or imperfections in the material which may have been occasioned by other causes, such as handling of the material.

While I have shown and described a preferred embodiment of my invention, it will be understood that the invention is not limited to its illustrated embodiment but may be otherwise embodied within the scope of the appended claims without departing from the spirit of the invention.

I claim:

1. The method of unrolling a coiled body of material comprising distorting the body of the coil to free one end thereof, and utilizing the free end of the coil for a further unrolling operation.

2. The method of unrolling a coiled body of material, comprising first distorting the body of the coil to free one end thereof, and then moving the body of the coil to cause the free end thereof to move into operative relation with respect to means for seizing it.

3. The method of unrolling a coiled body of material comprising distorting the body of the coil to free one end thereof, and moving the body of the coil to cause the free end thereof to be directed into operative relation with respect to means for seizing it.

4. The method of unrolling a coiled body of material, comprising first distorting the body of the coil to free one end thereof, and then moving the body of the coil to cause the free end thereof to be directed into a set of rolls.

5. The method of unrolling a body of coiled material which comprises the steps of causing the body of the coil to assume an elliptical shape and thereby free one end of the coil, and then moving the body of the coil to bring the free end thereof into operative relation with respect to means for seizing it.

6. The method of unrolling a body of coiled material which comprises causing the body of the coil to assume an elliptical shape and thereby free one end of the coil, and then turning the body of the coil to bring the free end thereof into operative relation with respect to means for seizing it.

7. The combination with a feeder mechanism for a body of coiled material, of means for distorting the shape of the body of material for freeing one end thereof adjacent to the feeder mechanism.

8. The combination with a feeder mechanism for a body of coiled material, of means for distorting the shape of the body of material for freeing one end thereof, and means for directing the free end of the coil into operative relation with respect to the feeder mechanism.

9. The combination with a feeder mechanism for a body of coiled material comprising a roller, of means for distorting the shape of the body of material to free an end thereof and for causing a driving engagement to exist between the body of material and the roller, and means for guiding the free end of the coil into the feeder mechanism.

10. The combination with a feeder mechanism for a body of coiled material comprising a roller, and a guiding device, and of means for distorting the shape of the body of material to free one end thereof and for causing a driving engagement to exist between the body of material and the roller, whereby upon the actuation of the roller the free end of the coil is caused to engage the guiding device and to be directed into the feeder mechanism.

11. The combination with a feeder mechanism for a body of coiled material comprising a roller and a guiding device, of means for distorting the shape of the body of material to free one end thereof and for causing a driving engagement to exist between the body of material and the roller, whereby upon the actuation of the roller the body of material is turned to cause the free end thereof to engage the guiding device and to be directed by it into the feeder mechanism.

12. The combination with a feeder mechanism for a body of coiled material comprising a plurality of rollers, of means for distorting the shape of the body of material to free an end thereof and for causing a driving engagement to exist between the body of material and the rollers, and means for guiding the free end of the coil into the feeder mechanism.

13. The combination with a feeder mechanism for a body of coiled material comprising a plurality of rollers and a guiding device, of means for distorting the shape of the body of material to free an end thereof and for causing a driving engagement to exist between the body of material and the rollers, whereby upon the actuation of the rollers the body of material is turned to cause the free end thereof to engage the guiding device and to be directed by it into the feeder mechanism.

14. A mechanism for unrolling a body of coiled material, comprising a feeder mechanism having a roller therein, a guiding device, and means for pressing the body of coiled material against the roller for distorting its shape to free one end thereof and for causing a driving engagement to exist between the roller and the coiled material while the latter is turned to bring the free end into engagement with the guiding device and the feeder mechanism.

15. A mechanism for unrolling a body of coiled material, comprising a feeder mechanism having a plurality of rollers therein, a guiding device, and means for pressing the body of coiled material against the rollers for distorting its shape to free one end thereof and for causing a driving engagement to exist between the rollers and the coiled material while the latter is turned to bring the free end into engagement with the guiding device and the feeder mechanism.

16. In the method of unrolling a coiled body of material, the steps consisting in distorting the body of the material to free one end thereof, and then effecting relative movement between a portion of the distorting mechanism and the body of the material whereby the free end thereof may be utilized for further unrolling operations.

17. A mechanism for unrolling a body of coiled material, comprising deforming and feeding mechanism, means for actuating said mechanism to deform a coil and free one end thereof, and means for effecting relative movement between the deformed coil and a part of said mechanism to bring said end and said feeding mechanism into cooperative engagement.

18. In the method of unrolling a coiled body of material, the steps consisting in distorting the body of the coil to free one end thereof, and engaging said free end with a straightening mechanism effective for further unrolling the coil.

19. A mechanism for unloading a body of coiled material comprising the forming and feeding mechanism, means for actuating said mechanism to deform a coil and free one end thereof, and means for effecting relative movement between the deformed coil and a part of said mechanism to bring said end and said feeding mechanism into cooperative engagement, said feeding mechanism comprising a plurality of material engaging members so located as to exert a straightening action on the material in engagement therewith.

In testimony whereof I have hereunto set my hand.

LANE JOHNSON.